(12) United States Patent
Fadelli et al.

(10) Patent No.: US 7,449,665 B2
(45) Date of Patent: Nov. 11, 2008

(54) APPARATUS FOR COOKING FOOD PRODUCTS ON BOTH SIDES THEREOF WITH MICROWAVES AND RADIATED HEAT

(75) Inventors: Marino Fadelli, Treviso (IT); Franco Tassan Mangina, Pordenone (IT); Marco Ulian, Udine (IT); Roberto Dorigo, Venice (IT)

(73) Assignee: Electrolux Professional SpA, Pordenone (IT)

( * ) Notice: Subject to any disclaimer, the term of this patent is extended or adjusted under 35 U.S.C. 154(b) by 0 days.

(21) Appl. No.: 11/907,690

(22) Filed: Oct. 16, 2007

(65) Prior Publication Data
US 2008/0099471 A1    May 1, 2008

(30) Foreign Application Priority Data
Oct. 17, 2006    (IT)    ...................... PN2006A000081

(51) Int. Cl.
*H05B 6/80*    (2006.01)
*A47J 36/38*    (2006.01)

(52) U.S. Cl. ........................ 219/680; 219/685; 219/725; 219/756; 219/762; 99/451

(58) Field of Classification Search ......... 219/680–685, 219/725–735, 756–757, 762–763; 99/451, 99/DIG. 14
See application file for complete search history.

(56) References Cited

U.S. PATENT DOCUMENTS 5,235,150 A * 8/1993 Buske et al. ................ 219/722
2004/0026415 A1 * 2/2004 Piasentin et al. ............ 219/680
2006/0289514 A1 * 12/2006 Baumann .................... 219/729

FOREIGN PATENT DOCUMENTS

| WO | 99/44394 | 9/1999 |
|---|---|---|
| WO | 03/098972 | 11/2003 |

* cited by examiner

*Primary Examiner*—Philip H Leung
(74) *Attorney, Agent, or Firm*—Wenderoth, Lind & Ponack, L.L.P.

(57) ABSTRACT

Apparatus for cooking food products on both sides thereof, comprising a base member associated to a bottom heating surface, a first electric heating element located between the base member and the bottom heating surface, an upper movable member associated to a top heating surface, a second electric heating element located between said upper member and said top heating surface, and one or more microwave generators housed in the base member; when said upper member is lowered, the top heating surface comes to lie opposite to the bottom heating surface so as to form a cooking cavity therebetween.

Said first electric heating element is separated from the bottom heating surface by a hollow space and the microwave generator is placed in such position, with the use of appropriate wave-guide means, as to allow the microwaves issuing therefrom to propagate towards said hollow space and, eventually, towards the bottom surface of said bottom heating surface.

18 Claims, 7 Drawing Sheets

APPARATUS FOR COOKING FOOD PRODUCTS ON BOTH SIDES THEREOF WITH MICROWAVES AND RADIATED HEAT

BACKGROUND OF THE INVENTION

1. Field of the Invention

The present invention refers to an improved kind of griddle or plate for cooking food products in a quick manner on both sides thereof.

2. Description of the Related Art

Widely known in the art are currently broilers, or griddles, that are used to cook food products of the most varied kind, such as hamburgers, toasted rolls, meat in general, and the like.

The features and peculiarities of such griddles are extensively described in the European patent application EP 06 111 596.0 filed by this same Applicant, which reference should therefore be made to for reasons of brevity and greater illustrative simplicity.

Griddles of the kind described in the above-cited document have proven to be simple to manufacture and easy to operate; however, in practical use they have been found to be connected with a particular drawback tending to affect their capability of being used in a satisfactory manner and, as a result, their actual acceptance by the users, such drawback lying practically in the fact that the heating elements (27) are placed and arranged in close proximity of the bottom heating surface (3) and the microwave generator is in turn provided under the heating surface and, as a result, also under the heating elements, and is of course oriented upwards. It therefore ensues that the microwaves have necessarily to pass through the heating elements, which undesirably form an ample shield opposing the propagation of the microwaves and prevent in a clearly appreciable manner the same microwaves from being able to fully efficiently and effectively reach the food product placed upon the bottom heating surface.

Needless to say that such a problem is further aggravated by the drawbacks deriving from electromagnetic coupling problems brought about by such unacceptable shielding effect created by the heating elements.

Known from the disclosure in WO 03/098972 (O ZON INC.) is an apparatus for processing small food portions, such as toasted and filled rolls, small pizzas and the like, with the aid of microwaves. This apparatus is made so as to feature small cavities or chambers having a flat bottom and raised peripheral edges, and such chambers are capable of being closed from above by means of a kind of microwave-tight cover. In addition, such chambers can be heated with the use of heating means of any traditional kind as largely known as such in the art, so that the food product being placed inside these cooking chambers for processing is exposed to both a conventional heating treatment and a microwave heating treatment at the same time when the related chamber is closed.

No indication is, however, given in the above-cited document as to how the traditional, or thermal, heating means can be prevented from at the same time acting as a shield opposing microwave propagation, nor is any teaching given as to the construction measures that can be taken in view of avoiding such an undesirable effect.

Known from the disclosure in WO 99/44394 is an apparatus for cooking foods by both traditional electric heating and microwave heating. However, the food products being cooked—although fully capable of being baked, i.e., grilled in a traditional manner, owing to the two mutually opposing grilling/heating surfaces (2') being able to be displaced into contacting the food to be cooked (4)—cannot practically being treated with the emission of microwaves in any satisfactorily even manner, since such microwave emission takes place in a direction that is parallel to the grilling/heating surfaces themselves. Moreover, the cavity or chamber, in which the food to be processed is contained and retained, can be closed through double handling calling for the bottom grilling/heating surface to be displaced, i.e., moved horizontally and the top grilling/heating surface to be lowered. This adds inconvenience in the use of the apparatus and lengthens the time usually needed to operate it, further introducing complications in the construction of the apparatus.

SUMMARY OF THE INVENTION

It would therefore be desirable, and it is a main object of the present invention to provide an apparatus for grilling and, at the same time, treating food products with microwaves, which can be easily and conveniently opened with simple handling, such as a simple griddle or similar appliance that can be opened from above, i.e., of the top opening kind, and is capable of grilling food products on both sides thereof at the same time.

According to the present invention, this aim is reached with an apparatus, in particular of the type intended for use in commercial foodservice and mass-catering applications, incorporating the features as defined and recited in the appended claims.

Features and advantages of the present invention will anyway be more readily understood from the description that is given below by way of non-limiting example with reference to the accompanying drawings, in which:

Figure 1:
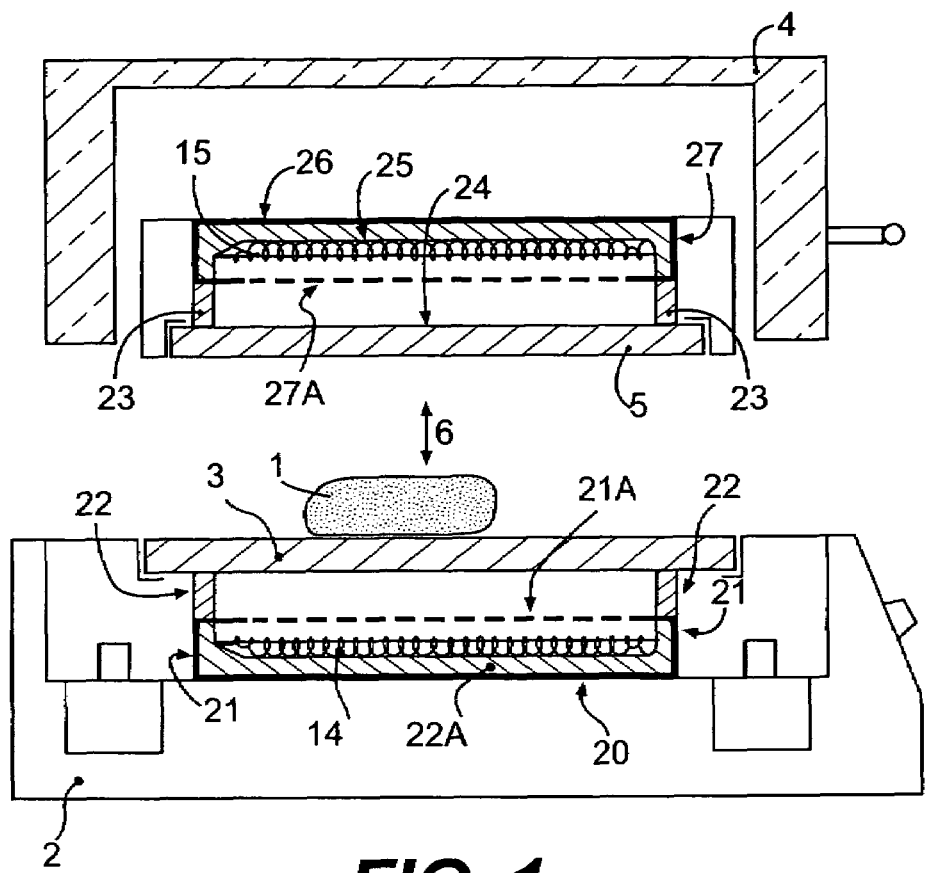
FIG. 1 is a front and cross-sectional elevational view of a food cooking apparatus according to the present invention, as represented in a symbolical, simplified manner with its upper plate raised in the resting, i.e., inoperative, position thereof.

An apparatus for cooking a food product 1 as it is generally known from the prior art comprises: a base member 2 associated with a lower or bottom heating surface 3 adapted to support food products to be cooked, and an upper member 4 associated with an upper or top heating surface 5 and pivotally joined to the base member 2 so that, when the upper member 4 is lowered or swung towards the base member 2, the top heating surface 5 moves close to the bottom heating surface 3 supporting the food to be cooked, so as to enclose the latter therebetween.

The bottom heating surface 3 supporting the food to be cooked and the top heating surface 5 are made of a rigid material that is transparent to both microwaves and radiated heat without being damaged by either, as typically constituted by glass-ceramic plates as generally known as such in the art.

The kind of movement needed to lower the upper member 4, i.e., the top heating surface 5 onto the bottom heating surface 3 lying therebelow can, for instance, be a rotary one about a hinging pin provided on the base member 2, a simple translational one, or a combination of both. These details will not be explained further because they are generally and widely known to all those skilled in the art.

The base member 2 and the upper member 4, when closed in against each other, are adapted to define—in the volume comprised therebetween—a gap in which the food products are placed to be cooked, and in which the heating surfaces 3 and 5 are provided.

The aforementioned microwave generators may consist of either a single generator or a plurality of generators. Accordingly, even the internal configuration of the base member may vary. Such circumstance shall, however, be explained and illustrated in greater detail further on.

The bottom heating surface 3 covers and substantially closes the area on top of the base member 2 and, similarly, the top heating surface 5 covers and substantially closes the area at the bottom of the upper member 4.

Figure 2:
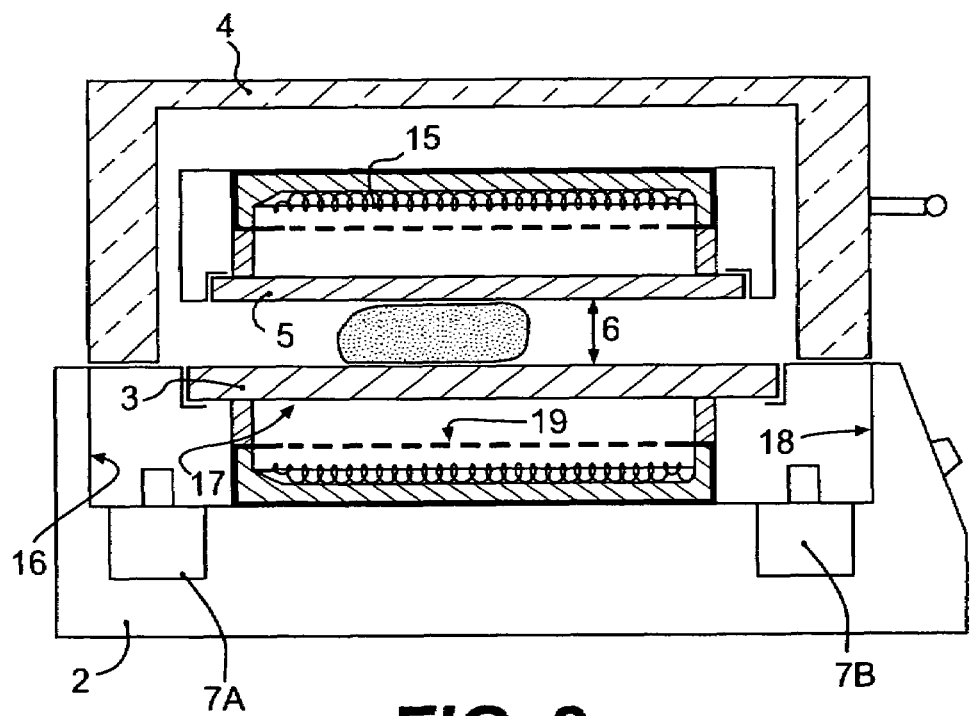
FIG. 2 is a similar view of the food cooking apparatus shown in FIG. 1, however represented in a state in which its upper plate is lowered into the cooking position thereof.

According to the present invention, and with reference to the illustrations in FIGS. 1 and 2, under the bottom heating surface 3 there is arranged a first electric heating element 14, which is housed within the base member 2, and, in a similar manner, above the top heating surface 5 there is arranged a second electric heating element 15, which is housed within the upper member 4.

Both of the heating surfaces 3 and 5 are made of a material that is resistant to high temperatures and substantially transparent to both microwave and infrared radiation, so that heat produced by the electric heating elements 14 and 15 passes directly on to the food 1 being cooked.

In addition, inside the base member 2 there are housed one or more microwave generators 7A, 7B to irradiate the food products enclosed within the heating surfaces 3 and 5; the same cooking cavity formed by the base and upper members when closed against each other defines and forms a microwave screen adapted to retain the microwaves therewithin, i.e., prevent them from leaking outside.

In the case illustrated in FIG. 2, within the base member 2 there are provided two distinct microwave generators 7A and 7B, which are positioned such that they are located at the sides of the first electric heating element 14. Further, the microwave generators 7A and 7B are arranged so that the respective microwaves propagating therefrom can—following an inclined path and without passing through the first electric heating element 14—reach and hit the bottom or lower face 17 of the bottom heating surface 3. In the case that the microwave generators 7A and 7B are placed quite at the side of, i.e., in a markedly lateral position relative to the first electric heating element 14, or in a position quite down below the first electric heating element 14, the above-cited condition can be alternatively complied with by also providing suitable waveguide channels 16, 18, as generally known and such in the art and preferably provided in the same base member as shown in the Figures, which will then appropriately convey the microwave propagations towards the bottom face 17.

In view of ensuring the occurrence of the above-cited conditions, the first electric heating element 14 must be adequately and appropriately spaced from the bottom heating surface 3. As a result, a hollow space 19 is created between the bodies 3 and 14.

In order to support the first electric heating element 14, and also in view of preventing it from being able to be reached by the microwaves issued by and propagating from the generator 7A, i.e., an occurrence that would give rise to easily and clearly imaginable electromagnetic coupling and interference problems, underneath the first electric heating element 14 there is placed a first shielding means 20, which is typically configured in the form of a planar sheet-metal plate so arranged as to extend under the first electric heating element 14. Preferably, however, the first shielding means 20 is provided with one or more upward-oriented side walls 21 joining to a perforated metal member 21A, which is arranged so as to extend between the electric heating element 14 and the bottom heating surface 3, and which is typically provided in the form of a grid or meshwork of metal wires (transparent to infrared radiation, but not to microwaves), so as to form a box-shaped member that is effective in ensuring that the first electric heating element 14 contained therewithin is fully shielded from and unaffected by the microwaves being emitted.

For it to be able to ensure a thermal protection of the other members and parts of the apparatus mounted therearound against the heat generated by the heating element, while at the same time allowing microwaves to pass therethrough without any attenuating effect whatsoever, in an advantageous manner the upright metal shielding provision 21 is coupled internally to two walls 22, which are also extending vertically in a position opposing the first electric heating element 14 at both sides thereof, and which are made of a heat-insulating, microwave-permeable material, such as a ceramic-fiber material as it is largely known in the art.

In an advantageous manner, these walls 22 may be provided so as to continue to eventually join into a semi-peripheral member 22A extending below the respective first electric heating element 14 and—of course—also above the shielding means 20, so as to reduce heat losses downwards from the radiation area of the heating element 14.

Moreover, these walls 22 delimit—in correspondence to the food support area of the heating surface 3—the cooking zone C for both the heat radiated by the heating element 14 and the microwave energy to be able to safely propagate therewithin. Conversely, in the cooking zone D extending annularly around the cooking zone C externally thereto, only microwaves are allowed to flow and propagate so as to hit the food—placed upon the heating surface and extending also outside the cooking zone C as defined above—from both the sides and above (FIG. 3).

Referring again to FIGS. 1 and 2, the second electric heating element 15 is in turn surrounded—above and at the sides thereof—by a second heat shielding means 25, whose lower edges 23 are firmly and solidly connected to the upper face 24 of the top heating surface 5. In addition, even this second or upper electric heating element 15 is surrounded by a metal shielding protection casing 26, 27 that extends further under the heating element 15 into a perforated sheet-metal plate 27A, or the like, in a manner that is fully similar to how the aforementioned parts 20, 21 and 21A are used to surround the first or lower electric heating element 14, albeit in a roughly mirror-image arrangement relative thereto.

Advantageously, even the second heat shielding means 25 is made using a material that has the same properties as the material used for the aforementioned first shielding means 22 and 22A.

Figure 3:
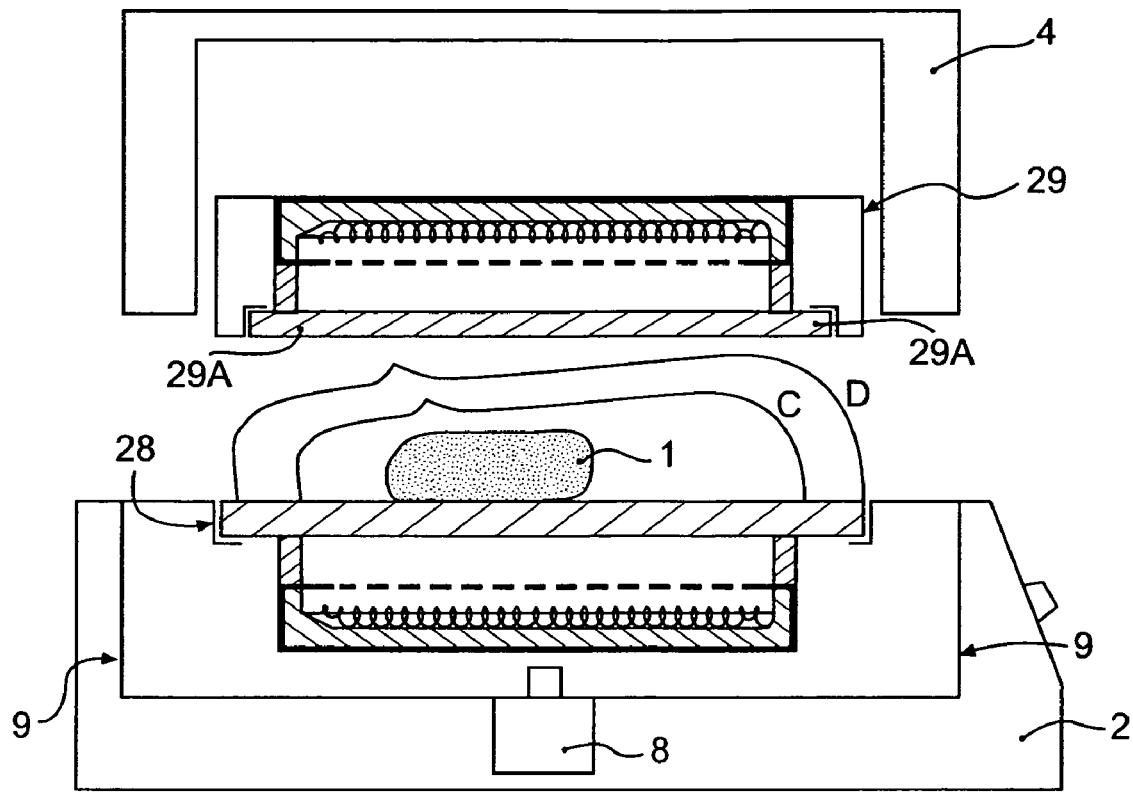
FIGS. 3 and 4 are corresponding views of a simplified embodiment of the apparatus shown in the preceding Figures, as viewed with its upper plate raised in the inoperative position thereof and lowered in the cooking position thereof, respectively.
Figure 4:
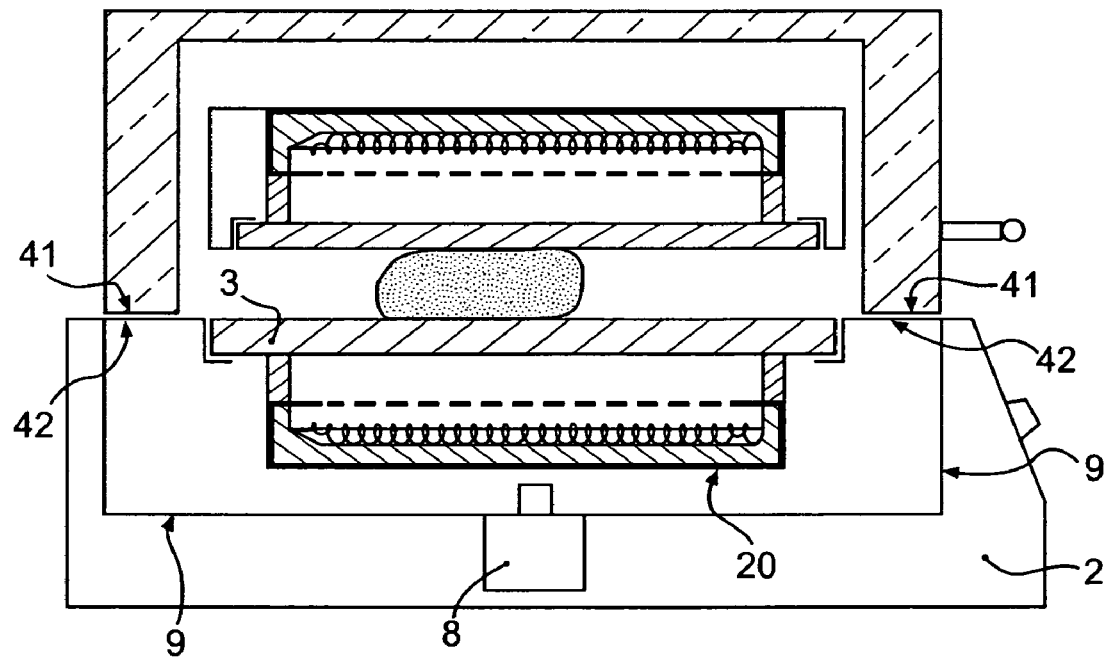

While the bottom heating surface 3 is supported upon the base member 2 by means that are generally known as such in the art, such as by appropriately providing the base member 2 with a bracket-like contour 28 (FIG. 3) acting as a support for such heating surface, the top heating surface 5 may on the contrary be associated to the respective heating element through a connection and support framework or casing 29 that is shaped as illustrated in FIGS. 3 and 4, i.e., internally hollow so as to form a downward-oriented cavity adapted to contain the shielding casing 26, 27, the perforated plate 27A, and the various devices and parts associated thereto, i.e., the heat shielding means 25 and the second electric heating element 15, therewithin, while being joined to the edges 29A of the top heating surface 5, so as to form a rigid and solidly built assembly on the whole.

A cooking apparatus is in this way provided, which is adapted to process any food product 1 that is placed upon the bottom support and heating surface 3 by both thermal effect, i.e., by grilling it under radiated heat, and microwave heating effect.

In fact, upon placing the food product 1 thereupon, all it takes is lowering the upper movable member 4 so as to close it in on the base member 2 and ensure that the thereby automatically formed cooking cavity or chamber 6 features a tightly sealed construction. In addition, the food product 1 can be both irradiated, i.e., hit by the infrared radiation emitted by the two electric heating elements 14 and 15 from both opposite sides of the food product being exposed, and reached by the propagating microwaves that pass through both the insulating walls 22 and the bottom support and heating surface 3 in an ascending flow pattern.

The microwave propagation, in fact, reaches the lower or bottom side of the support surface 3 through the passage provided between the surface and the perforated surface of the metal shielding means 27 to eventually pass through the same surface 3 and hit the food product placed thereupon. Furthermore, the microwave propagation is positively prevented from being able to reach the lower electric heating element 14 owing to its being guarded off by the same metal shielding means 27, whose perforations are, on the other hand, such as to allow the respective infrared radiation to pass therethrough and reach the bottom face of the food support surface 3.

A fully similar process takes place within the upper movable member 4 in connection with the second electric heating element 15 provided thereinside, so that it shall not be described again for reasons of greater simplicity.

As far as the operation of the above-described cooking apparatus according to the present invention, it will be capable of being operated in the microwave-only mode, in the infrared heat-only mode, as well as in the combined mode using both microwaves and infrared heat.

Further and more sophisticated operating modes can in addition be provided, in which the power levels being generated and output can, for instance, be modulated and regulated in a useful manner. Such operating modes, however, are fully similar to those generally available in combination ovens using microwaves and traditional heat as currently available on the market, so that—owing to them being largely known to and within the abilities of all those skilled in the art—they shall not be explained any further.

Although only two microwave generators are represented in the aforementioned Figures as generally indicated at 7A and 7B, it shall be appreciated that more than two microwave generators may be provided and used in the inventive apparatus as well.

With reference to FIGS. 3 and 4, an alternative configuration to the use of two distinct microwave generators is the use of a single microwave generator 8, which is placed immediately under the first shielding means 20, wherein the surrounding volumes and parts will be so sized as to allow for such a situation and arrangement.

Advantageously, the single microwave generator 8 is placed in a central position relative to the bottom heating and food support surface 3 lying thereabove, so as to enable the food to be treated in a more even and homogeneous manner by the microwaves issuing therefrom. Furthermore, appropriate waveguides 9 need to be provided in this particular case, wherein such waveguides have to be designed and arranged so as to ensure that the microwave propagation from the microwave generator 8 is effectively able to reach the bottom heating and food support surface 3 with just minimal loss.

As already stated above, when the upper movable member 4 of the apparatus is lowered to close in on the base member 2, the lower edges 41 of the upper movable member 4 close against the corresponding upper edges 42 of the base member 2, thereby providing the cooking cavity or chamber 6 adapted to confine the microwaves therewithin.

In order to ensure that the top heating surface 5 will effectively move into and take the right position relative to the food to be cooked after the upper movable member 4 has been lowered, and taking into due consideration also the fact that the right position may also correspond to a height of the member, at which the top heating surface 5 is not in contact with the food product to be treated, such as in the case of small pizzas and similar food items, following improvements are proposed.

Figure 5:
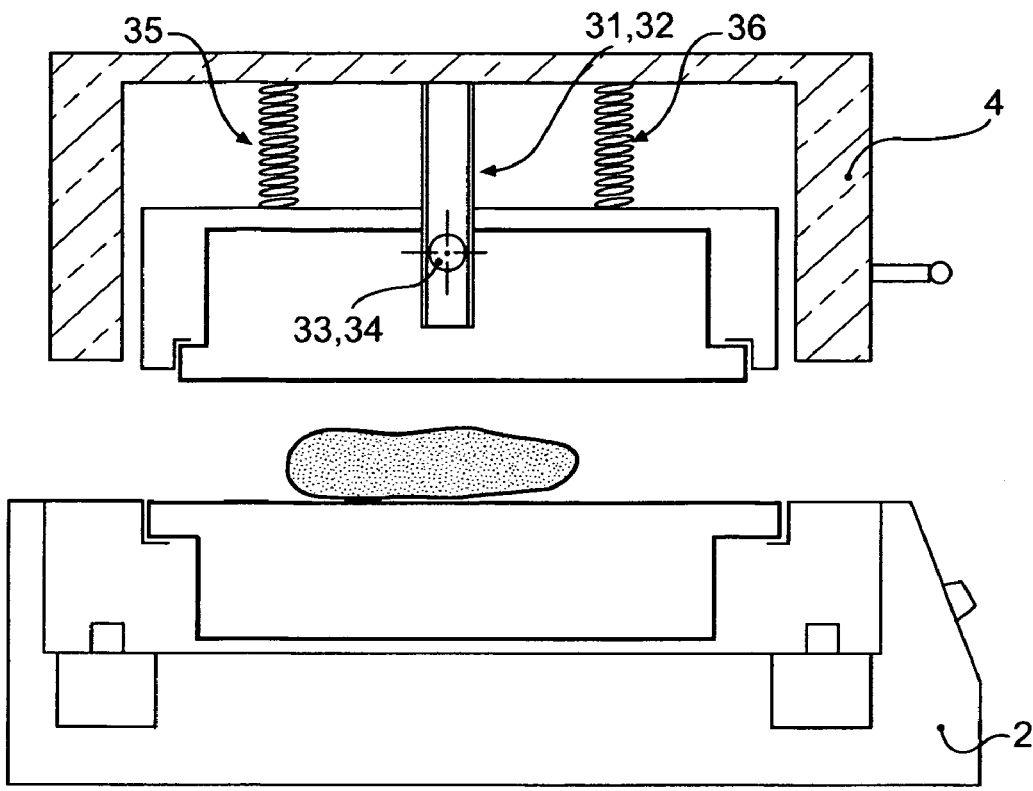
FIGS. 5 and 6 are views of a different embodiment of the apparatus shown in the preceding Figures, as viewed with its upper plate raised in the inoperative position thereof and lowered in the cooking position thereof, respectively.
Figure 6:
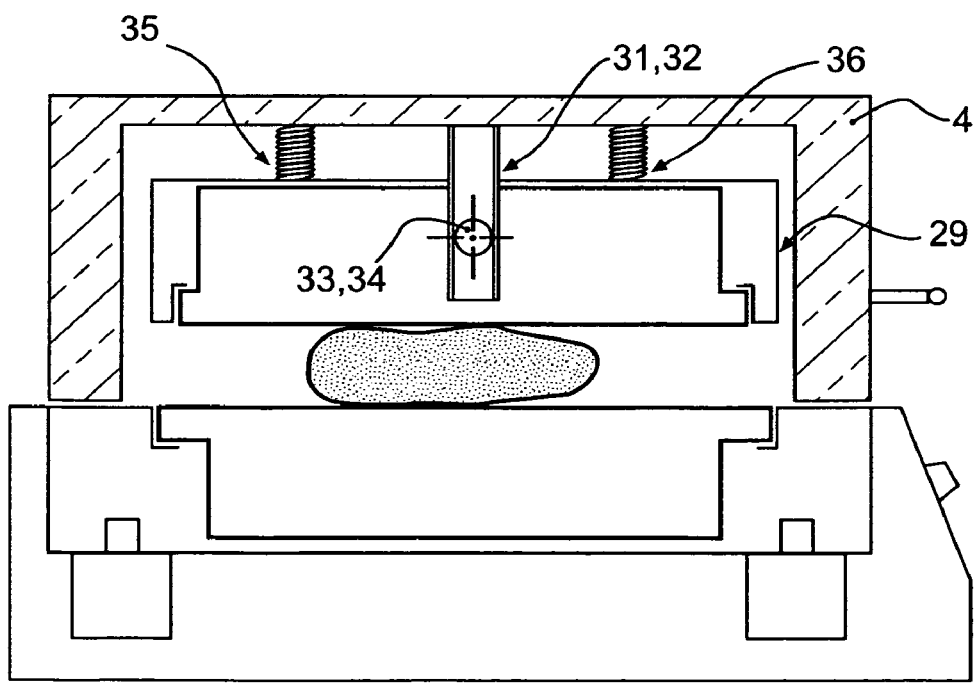
Figure 7:
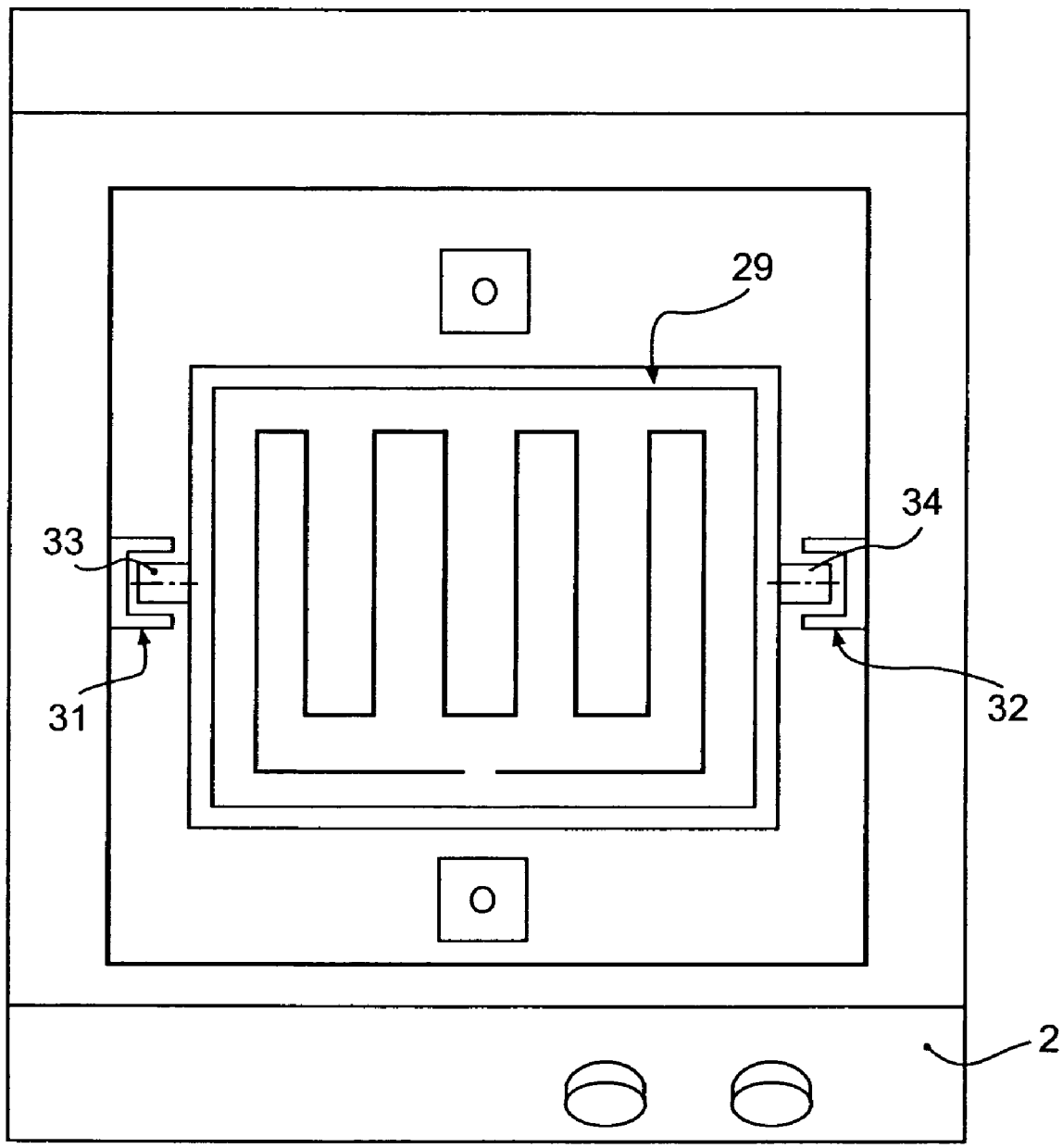
FIG. 7 is a see-through top view of the upper plate shown in FIGS. 5 and 6.

With reference to FIGS. 5 and 6, the afore-mentioned framework or casing 29, along with the various parts and devices as described previously, is connected to the upper movable member 4 by means of two guide grooves 31, 32 provided integrally with or, anyway, firmly joined to the upper movable member 4 inside the latter and oriented downwards, in the shape of a U with the open side facing inwards, and two respective sliding arms 33 and 34 provided integrally with or, anyway, firmly joined to the framework or casing 29 so as to extend horizontally therefrom, and adapted to slidably fit into the respective ones of the open sides of the U-shaped grooves.

Conclusively, the above-noted parts and members are so sized and positioned relative to each other as to ensure that the framework or casing 29, along with all devices associated thereto, i.e., basically the shielding casing 26, 27, 27A and the second electric heating element 15 that form a rigid and firmly joined assembly on the whole, is able to rise and sink, i.e., move up and down relative to the upper movable member 4, while being guided in these displacements thereof by the sliding arms 33 and 34 slidably engaging the respective grooves 31, 32.

As a result, when the upper movable member 4 is lowered, the top heating surface 5 is moved into contact with the corresponding portion of the food product to be cooked, thereby pressing it slightly due to the weight of the various devices and parts associated and joined thereto as described above, i.e., the framework 29, the shielding casing 26, 27, 27A and the second electric heating element 15.

With reference again to FIGS. 5 and 6, in the case that the so obtained pressing effect upon the food product proves to be too limited, i.e., inadequate, for the top heating surface 5, in the case that the so obtained pressing effect upon the food product proves to be too limited, i.e., inadequate, in order to ensure that the top heating surface 5 is able to automatically be brought or caused to adequately press against and firmly stabilize upon the upper portion of the food product, it is possible for such pressure to be increased through the application—between the inner surface of the upper movable member 4 and the outer or upper surface of the metal shielding member 26, 27—of two elastic elements 35, 36, preferably spiral or coil springs suitably anchored at the respective end portions thereof, such as to enable the total force that can be exerted—when lowered into the closed position thereof—by the upper movable member 4 (and the related top heating surface 5) upon the food product lying therebelow to be increased in a fully controllable manner.

When handling particular kinds of food products, such as small pizzas, canapés, and the like, the need may also arise for the food product to be heated from both the bottom and above, while however avoiding any contact of the heating surface with the upper portion of the same food product, the basic requirement calling for the whole food product to be irradiated by the microwaves remaining on the other hand fully unvaried. In this case, with reference to FIGS. 8 and 9, on the upper surface of the metal shielding member 26, 27, or the framework 29, there is advantageously applied, in a firmly joined manner, a threaded rod 40 that extends upwards and passes through the upper wall of the upper movable concave member 4, the wall being provided with an appropriate through-bore 41 to such purpose. Onto the portion of the rod 40 that extends above the upper movable member 4 there is screwed a kind of handwheel 42 that engages the threading on the rod.

Figure 8:
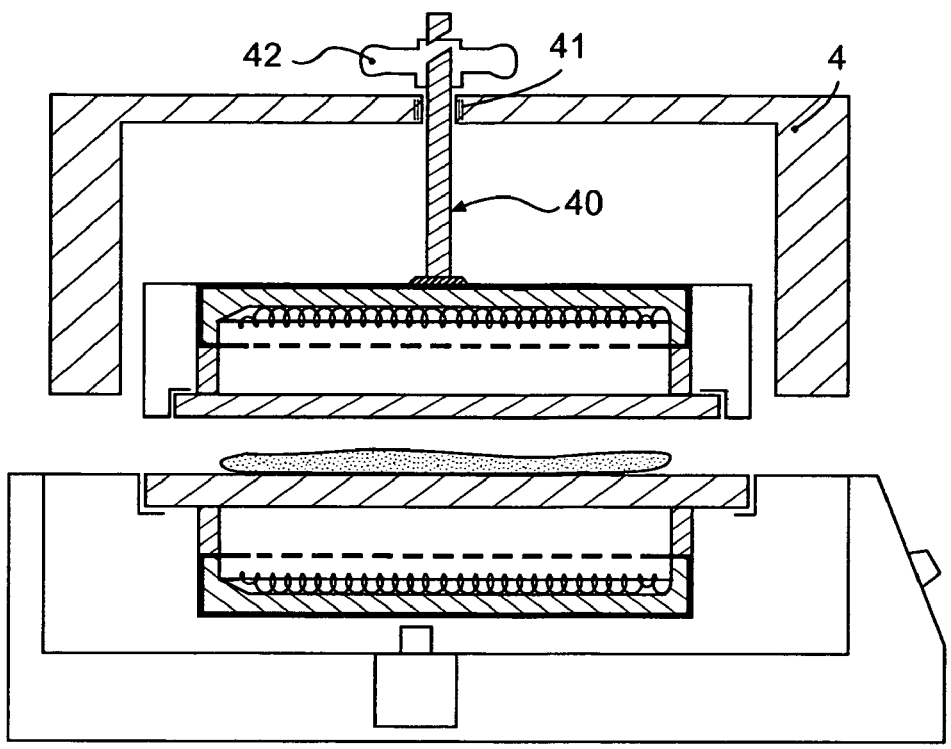
FIGS. 8 and 9 are views of a further different embodiment of the apparatus shown in the preceding Figures, as viewed with its upper plate raised in the inoperative position thereof and lowered in the cooking position thereof, respectively.
Figure 9:
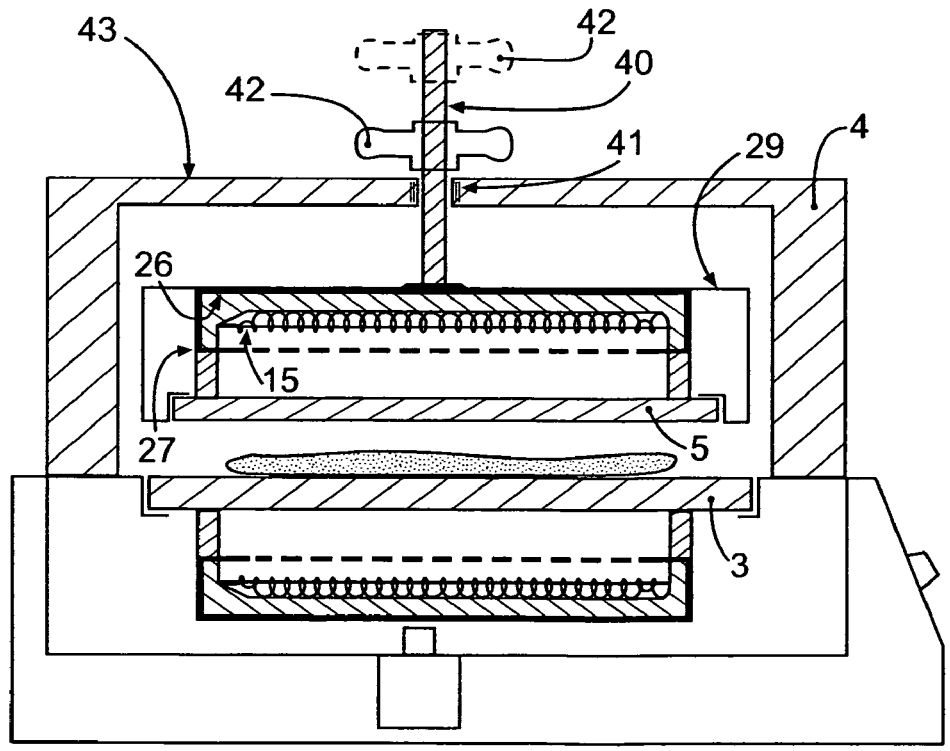

Comparing now the illustrations in FIGS. 8 and 9 with each other, it can be readily appreciated how the above-described contrivance operates. In fact, all it takes is rotating the handwheel 42 in the appropriate direction to cause it to slide, i.e., displace downwards along the rod 40, until it eventually comes into contact with the upper surface 43 of the upper movable member 4.

If the handwheel 42 keeps, at this point, being screwed on, the same handwheel—owing to its being clearly unable to move downwards any further due to the resistance opposed by the upper movable member 4—will start by reaction attracting upwards (corkscrew effect) the threaded rod along with the whole framework 29 and—jointly therewith—the assembly comprised of the shielding casing 26, 27, 27A and the devices and parts associated thereto, i.e., the upper electric heating element 15, the top heating surface 5 and the second thermally insulating protection means 25.

Accordingly, the whole assembly as defined above can be raised up to a predetermined height so that the top heating surface 5 is positioned at the desired distance above the food product to be treated.

Figure 10:
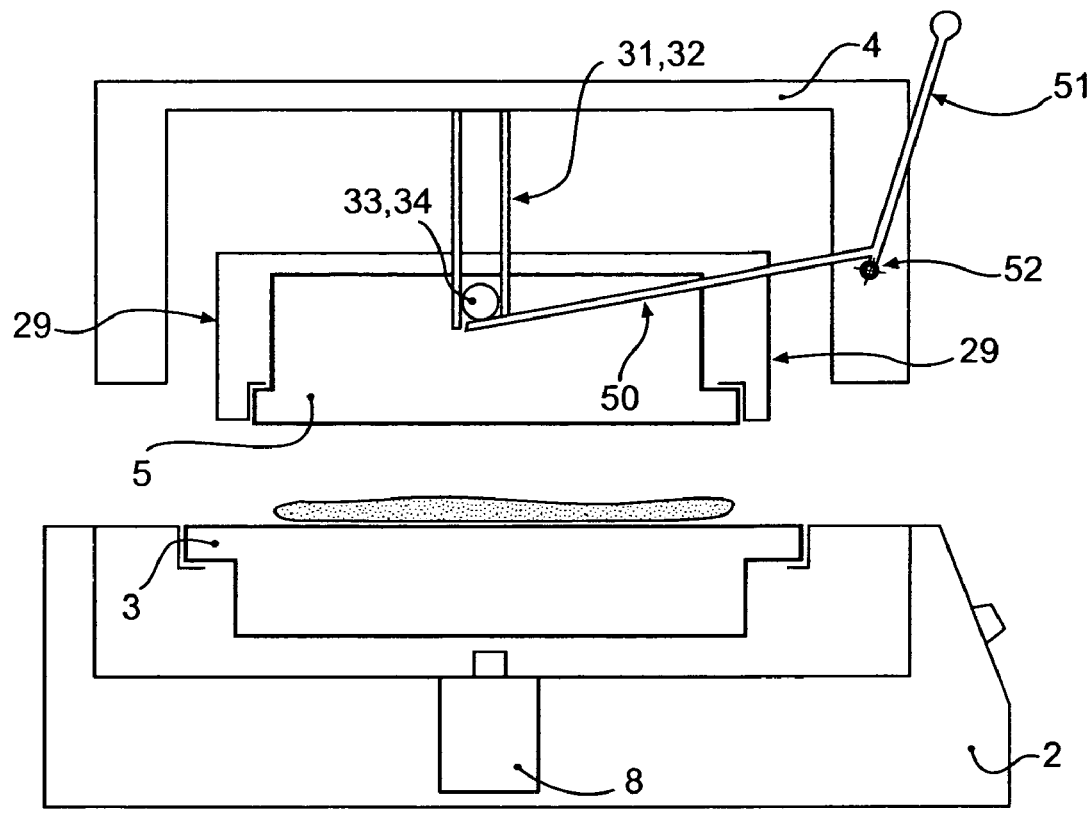
FIGS. 10 and 11 are views of a variation introduced in the embodiment of the apparatus shown in FIGS. 8 and 9, as viewed again with its upper plate raised in the inoperative position thereof and lowered in the cooking position thereof, respectively.
Figure 11:
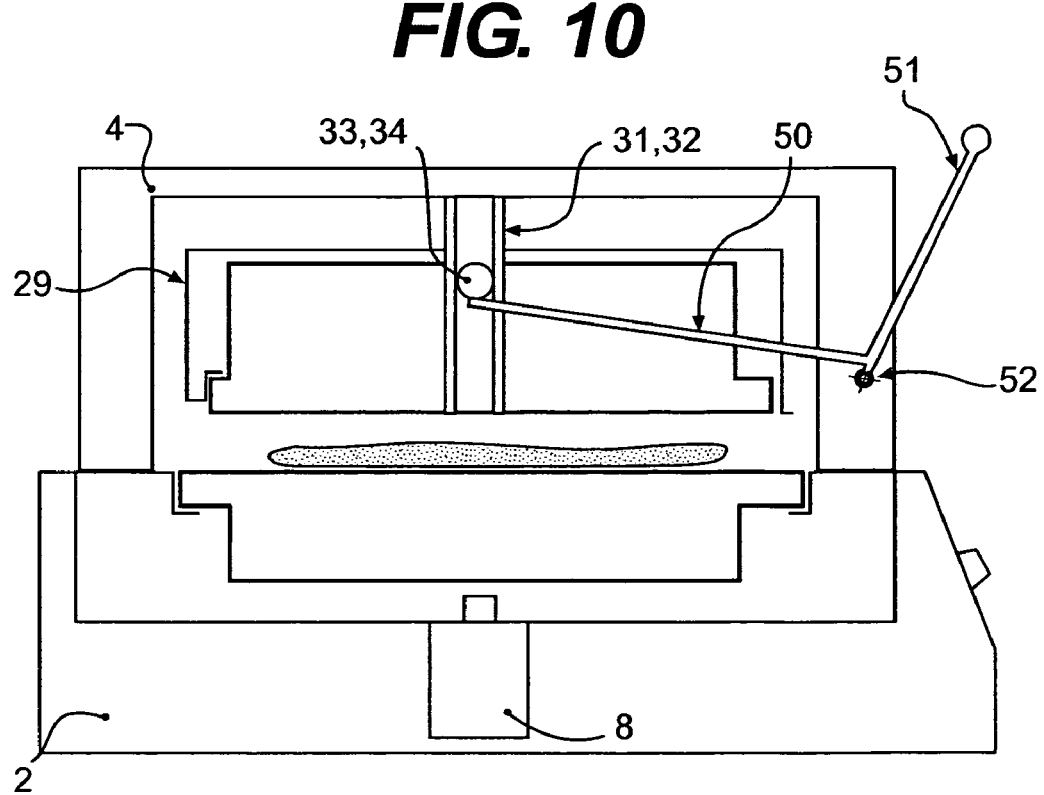
Figure 12:
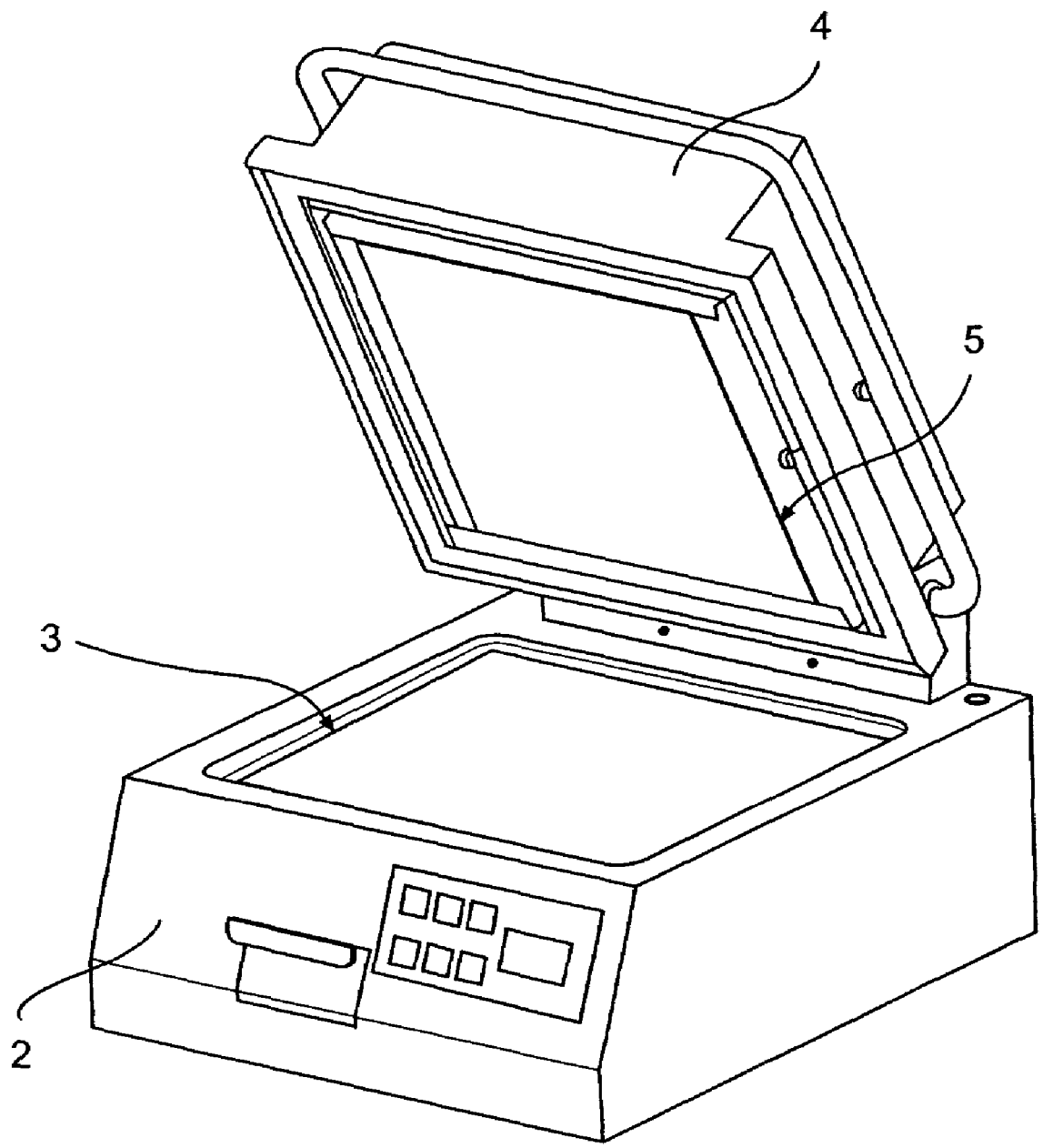
FIG. 12 is a simplified, outer perspective view of the cooking apparatus according to the present invention.

The above-described solution may of course be also embodied in other different forms and manners. For instance, and with reference to FIGS. 10 and 11, a particularly simple embodiment thereof may include in providing the upper movable member 4 with a first-class lever 50, 51 pivoted about a fulcrum located on a pin 52 applied on a vertical side wall of the upper movable member 4. The resistance arm 50 of the lever 50, 51 penetrates into the cavity of said upper movable member 4 to engage against the afore-noted sliding arms 33 and 34. The effort arm 51 of the lever is, on the contrary, located—with at least a portion thereof—on the outside of the upper movable member 4 and, as a result, is conveniently accessible to the user/operator. Therefore, when said effort arm 51 is pushed downwards, the resistance arm 50 inside the cavity of the upper movable member 4 is caused to rise, thereby lifting also the framework 29 jointly with the whole assembly comprised of the casing 26, 27, 27A and the devices and parts associated thereto, i.e. the upper electric heating element 15, the top heating surface 5 and the second thermally insulating protection means 25. This enables the desired effect to be obtained of raising the top heating surface 5 up to a pre-determined height, so as to position it above the food product to be treated at a desired distance therefrom.

A cooking apparatus is in this way provided, which—as this has been experimentally found and proven in a quite extensive and exhaustive manner—enables food products to be instantaneously cooked on both sides thereof by exposing them to both traditional heat and microwaves. In addition, this apparatus enables cooking times to be reduced to a quite significant extent, which certainly is a much sought-after feature in commercial and mass-catering foodservice applications, without burning the food products themselves.

A further advantage of inventive apparatus lies in the fact that it allows food products to be handled, i.e. cooked, which may vary to also a considerable extent in size, i.e. may have widely differing heights and extensions, thanks to the top heating surface that can be easily adjusted.

The invention claimed is:

1. An apparatus for cooking a food product on both sides thereof, the apparatus comprising:
    a base member having a bottom heating surface and upper edges, the bottom heating surface for supporting the food product;
    a first electric heating element located between said base member and said bottom heating surface;
    an upper movable concave member having a top heating surface and lower edges, said upper movable concave member being pivotally linked to said base member so as to be able to be lowered towards and close in on said base member, wherein, when said upper movable concave member closes in on said base member, said lower edges and said upper edges form a cooking cavity for the food product, the cooking cavity being delimited downwards by said bottom heating surface and delimited upwards by said top heating surface;
    a second electric heating element for heating said top heating surface; and
    at least one microwave generator contained in said base member, said at least one microwave generator being adapted to irradiate the food product contained in the cooking cavity, wherein
    said first electric heating element is separated from said bottom heating surface such that a hollow space is formed therebetween, and
    said at least one microwave generator is located, and provided with a waveguide, so that microwaves issued from said microwave generator propagate towards and into the hollow space and towards a bottom face of said bottom heating surface.

2. The apparatus according to claim 1, further comprising first heat-insulating walls enclosing a bottom and sides of said first electric heating element, said first heat-insulating walls being adapted to thermally insulate said first electric heating element so that heat emitted by said first electric heating element is confined by said first heat-insulating walls and directed to said bottom heating surface at a pre-defined central zone thereof.

3. The apparatus according to claim 2, further comprising a first metal shield enclosing a bottom and sides of said first electric heating element, said first metal shield having an extension that is perforated or interwoven so as to include perforations or meshes, respectively, that block microwaves, wherein said extension is interposed between said bottom heating surface and said first electric heating element.

4. The apparatus according to claim 2, further comprising a second metal shield having a plurality of perforations or apertures, wherein said second metal shield is interposed between said second electric heating element and said top heating surface.

5. The apparatus according to claim 1, further comprising a first metal shield enclosing a bottom and sides of said first electric heating element, said first metal shield having an extension that is perforated or interwoven so as to include perforations or meshes, respectively, that block microwaves,
wherein said extension is interposed between said bottom heating surface and said first electric heating element.

6. The apparatus according to claim 5, wherein said microwave generator is placed laterally relative to said first electric heating element at a position that is outside said first metal shield.

7. The apparatus according to claim 6, further comprising a second metal shield having a plurality of perforations or apertures, wherein said second metal shield is interposed between said second electric heating element and said top heating surface.

8. The apparatus according to claim 5, wherein said microwave generator is a single microwave generator and is placed in a position below said first metal shield.

9. The apparatus according to claim 5, further comprising a second metal shield having a plurality of perforations or apertures, wherein said second metal shield is interposed between said second electric heating element and said top heating surface.

10. The apparatus according to claim 1, further comprising a second metal shield having a plurality of perforations or apertures, wherein said second metal shield is interposed between said second electric heating element and said top heating surface.

11. The apparatus according to claim 10, wherein said second metal shield encloses a top and sides of said second electric heating element.

12. The apparatus according to claim 10, further comprising second heat-insulating walls enclosing a top and sides of said second electric heating element,
wherein lower edges of said second heat-insulating walls are joined to an upper face of said top heating surface.

13. The apparatus according to claim 12, further comprising a framework having a substantially concave configuration, said framework enclosing tops and sides of said second electric heating element, said second heat-insulating walls and said second metal shield, wherein lower extremities to of said framework join edges of said top heating surface.

14. The apparatus according to claim 13, further comprising guides located between said framework and said upper movable concave member, wherein said guides extend vertically and are firmly joined to said upper movable concave member, and said framework is provided with sliding elements adapted to slidably engage, respectively, said guides.

15. The apparatus according to claim 14, further comprising elastic elements between an inner surface of said upper movable concave member and an upper surface of said framework.

16. The apparatus according to claim 13, further comprising adjustment means for adjusting said framework or an upper side of said second metal shield to be positioned at pre-definable distances relative to an upper surface of said upper movable concave member.

17. The apparatus according to claim 16, wherein said adjustment means comprises a threaded rod and a handwheel, and
wherein a lower extremity of said threaded rod is firmly joined to an upper surface of said framework, a central portion of said threaded rod passes through a throughbore in an upper wall of said upper movable concave member, and said handwheel is adapted to externally engage threading on said threaded rod and rotate relative to said threaded rod so as to be able to be positioned at pre-definable heights.

18. The apparatus according to claim 16, wherein said adjustment means comprises a first class lever having a resistance arm, a fulcrum, and an effort arm, and
wherein said fulcrum is located at a side wall of said upper movable concave member, said resistance arm penetrates said upper movable concave member and engages portions of said framework, and said effort arm at least partially extends outside of the side wall of said upper movable concave member.

* * * * *